June 17, 1952  E. R. SABEL ET AL  2,600,580
ELECTROPHOTOGRAPHIC APPARATUS
Filed June 3, 1949  11 Sheets-Sheet 1

Fig.1

INVENTORS
Edward R. Sabel
Edward T. Macey
BY Harold E. Stonebraker
Their Attorney

June 17, 1952  E. R. SABEL ET AL  2,600,580
ELECTROPHOTOGRAPHIC APPARATUS
Filed June 3, 1949  11 Sheets-Sheet 4

Fig. 5

Inventors
Edward R. Sabel
Edward T. Murry
By Harold E. Stonebraker
their Attorney

June 17, 1952   E. R. SABEL ET AL   2,600,580
ELECTROPHOTOGRAPHIC APPARATUS
Filed June 3, 1949   11 Sheets-Sheet 6

INVENTORS
Edward R. Sabel
Edward T. Macey
BY
Harold E. Stonebraker
their Attorney

Patented June 17, 1952

2,600,580

UNITED STATES PATENT OFFICE 2,600,580

ELECTROPHOTOGRAPHIC APPARATUS

Edward R. Sabel and Edward T. Macey, Rochester, N. Y., assignors to The Haloid Company, Rochester, N. Y., a corporation of New York Application June 3, 1949, Serial No. 97,024

9 Claims. (Cl. 95—1.9)

This invention relates to electrophotographic apparatus, and has for its purpose to provide a unitary cabinet structure containing apparatus that enables an electrophotographic plate to be cleaned with cleaning powder, electrically charged, exposed, developed by the application of developer powder, and the powder image transferred to a transfer sheet, in a series of successive operations that can be performed conveniently, expeditiously, and successfully.

According to conventional practice in making electrophotographic copies, a sensitive plate consisting of a conductive backing coated with a photoconductive insulating material, having been thoroughly cleaned, is first charged electrostatically, then exposed under light to form an electrostatic image of the subject on the plate, following which the plate has applied to it an electroscopic or developer powder to form a powder image which is transferred electrostatically to a transfer sheet of paper or the like, and it has for a particular object to afford convenient mechanism all within a single cabinet and arranged so that the operator may readily and without changing position successively clean and charge the plate, expose the plate, apply developer powder to the plate to form a powder image, and transfer the powder image to a transfer sheet, by positioning the plate in different locations in the cabinet, all of the operations being performed from the front of the cabinet.

After the powder image has been transferred from the electrophotographic plate, it is desirable to remove from the plate all remaining particles of electroscopic powder before recharging, such cleaning operation being performed by suitable cleaning powder that is cascaded or gravitated over the plate, and it is a further purpose of the invention to provide in the cabinet a means for applying cleaning powder to the electrophotographic plate in a manner similar to that employed for applying the developer powder to the plate, the developing and cleaning operations being performed by similar mechanisms, one arranged above the other within the cabinet so as to enable conveniently and quickly cleaning a plate preliminarily to charging and exposing the same.

A more particular purpose of the invention is to afford a cabinet structure such as described above for making contact copies, in which the charged plate is held against the subject or copy during exposure in such manner as to insure effective and uniform contact between the subject and the plate and to prevent leakage of light, so as to produce successfully a clear and distinct electrical image on the plate, the density of which accords closely with the subject.

A further object of the invention is to provide a powder-applying mechanism of a character that is housed within the cabinet and can be readily withdrawn to a position in front of the cabinet where the electrophotographic plate can be attached and rotated to enable properly applying powder over the plate for the purpose of cleaning the plate with one such mechanism where cleaning powder is employed and for developing the powder image in the other mechanism where electroscopic or developing powder is employed.

An additional purpose of the invention is to afford a cabinet structure including powder-applying mechanisms at the lower part of the cabinet surmounted by charging mechanism, the upper part of the cabinet being removable from the lower part to permit access to the latter when required and containing a lamp chamber and electrical controlling means, the upper section of the cabinet including a top wall that is removably attached to permit access to the interior of the lamp chamber and is provided with a transparent panel through which exposure is made of the subject on to the electrophotographic plate, and means for holding the plate under pressure against the subject and transparent panel during exposure.

Another object of the invention is to afford a powder-applying mechanism including a powder receptacle arranged on a support that is slidable in the cabinet, together with means for retaining the powder receptacle on its support and permitting limited rotation of the receptacle through nearly a complete turn when the support is moved outwardly of the cabinet to permit access to the receptacle, upon which the plate can be removably fastened.

The invention has for still a further purpose to afford a structure that is simple, practical, and economical to produce, which can be readily assembled, is easily controlled and operated, which facilitates the production of electrophotographic copies in a manner that enables the process to be performed successfully in a commercial way in offices or plants where it is desirable to make frequent copies, and on which an operator can quickly and easily perform the required cycle of operations.

To these and other ends the invention consists in the construction and arrangement of parts that will appear clearly from the following description when read in conjunction with the accompanying drawings, the novel features being pointed out in the claims following the specification.

In the drawings:

Fig. 10ᵃ is an enlarged detail sectional view of a portion of Fig. 10;

Fig. 17 is an enlarged detail view in side elevation of the same;

Referring more particularly to the drawings in which like reference numerals refer to the same parts throughout the several views and to Figs. 1, 2, 5 and 6, the invention comprises a unitary cabinet that may be positioned at one edge of a table, or on any convenient support for operation, and houses a cleaning powder mechanism, developer powder mechanism, electrostatic charging mechanism, and lamp or exposure chamber, superposed respectively one upon the other, and to accomplish this, there is provided a cabinet consisting of a lower portion including a bottom wall 1, back wall 2, and side walls 3, while mounted upon said lower portion of the cabinet is an upper portion including bottom wall 4, which constitutes a light barrier between the lamp chamber and electrostatic charging chamber, back wall 5, front wall 6, side walls 7, and a top wall 8 having an opening 9 therein surmounted by a transparent panel 10 on which the copy or subject is arranged for exposure. 11 designates a lamp chamber provided with a lamp 12, and 13 designates a translucent or milk glass top for the lamp chamber 11, 14 is a light-retarding layer secured to the translucent top 13 above the lamp 12 centrally of the light chamber to disperse the light and prevent excessive concentration at one point of the plate, while 15 is a vertical wall at the rear of the lamp chamber separating the latter from the back wall 5 and affording a space at the rear of the cabinet to receive a transformer 16. The upper portion of the cabinet may be removably attached to the lower portion in any convenient way as by means of the fastening devices 17, and the top wall 8 is fastened to the upper portion of the cabinet by any convenient means, thus affording a light-tight enclosure from which light is directed through the transparent panel 10 on to the plate when the latter is exposed.

When light is transmitted through the transparent panel 10 of the lamp chamber, it is directed through the copy or subject positioned and held on the transparent panel 10 and on to a photoconductive surface of the electrophotographic plate which has previously been electrostatically charged, thus forming an electrostatic image on the electrophotographic plate corresponding to the image of the copy, and it is essential during this operation that the copy or subject be held closely and uniformly to the surface of the transparent panel 10 and that the photoconductive surface of the electrophotographic plate be held uniformly and closely against the copy, or against a flexible transparent copy retaining layer located between the copy and the electrophotographic plate, and it is also essential that there be no leakage of light around the edges of the electrophotographic plate during exposure.

To accomplish these objectives, the top wall 8 of the upper portion of the cabinet is provided with a vertical ledge 18 entirely surrounding the transparent panel 10 and terminating slightly below the upper surface thereof, see Fig. 5, while 19 designates a layer of flexible transparent material, entirely covering the transparent panel 10 and the copy thereon, and attached at its back end in any suitable fashion as at 21 to the top wall 8. The flexible layer 19 which may be of any transparent thin material such as cellophane or the like extends from its point of attachment upwardly over the ledge 18, thence forwardly entirely over the transparent panel 10, and downwardly in front of ledge 18 where it is provided at its forward edge with a metal or other weighted rod 22 attached to the flexible layer and extending entirely across the width of the transparent panel 10, acting to hold the flexible transparent layer 19 stretched over the transparent panel 10 in a smooth, taut state.

Figure 5:
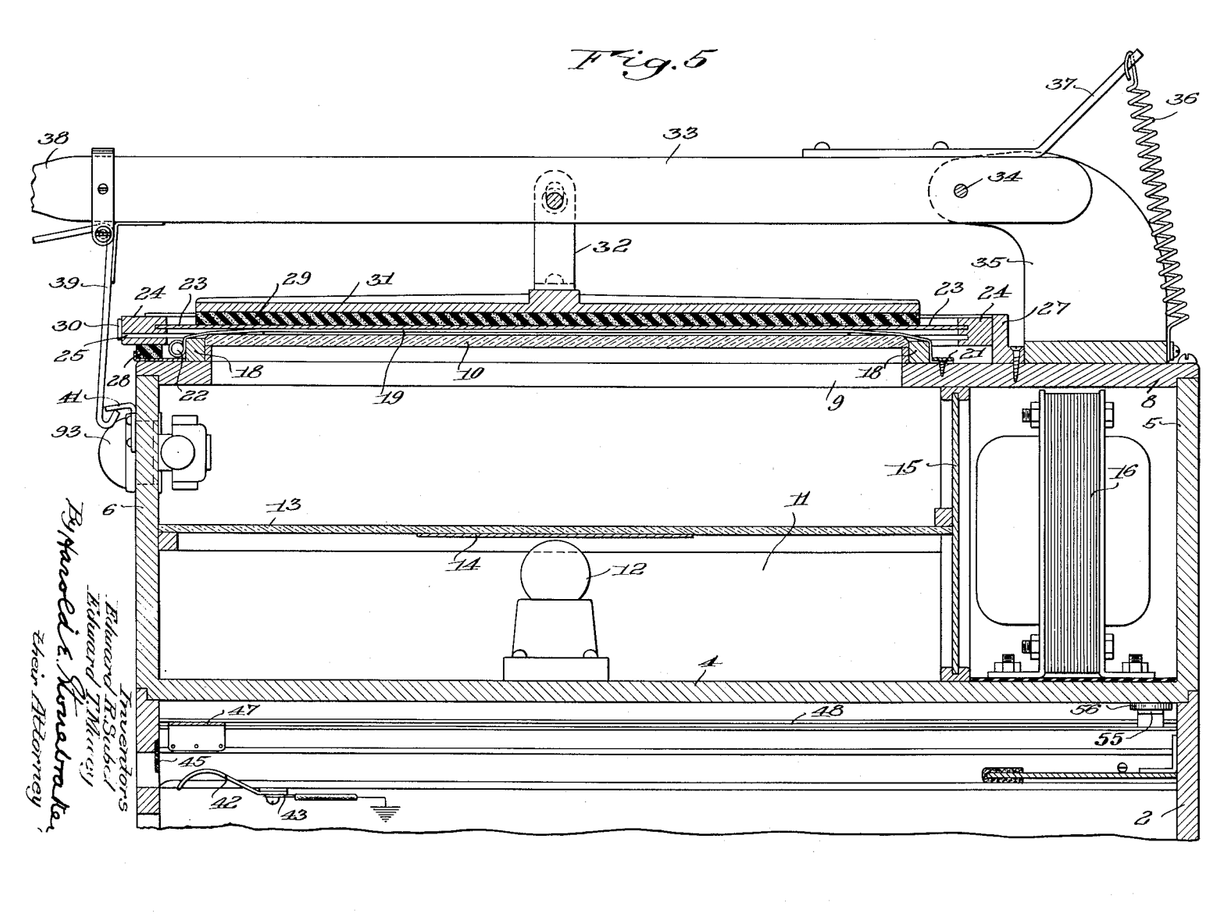
Fig. 5 is a vertical sectional view of the cabinet taken centrally with the lower portion of the cabinet broken away, and illustrating one electrophotographic plate in position for exposure.

The parts are illustrated in position for exposure in Fig. 5, and it will be understood that when the pressure pad, to be described presently, is elevated, the rod 22 and the flexible transparent layer can be lifted to position the copy under the transparent layer 19, between the transparent panel 10 and the transparent layer 19, which, by reason of the weight and tension of rod 22 that is attached to its forward edge in any suitable manner, engages the entire surface of the copy and holds it closely against the transparent panel 10.

The electrophotographic plate is indicated at 23, being mounted in a suitable plate-supporting frame 24, the latter being provided with a slot and guideways 25 to receive a removable light shield, as in copending application Serial No. 63,922, filed December 7, 1948, now Patent No. 2,588,675, and 26 designate a pair of leaf springs arranged at opposite sides of the transparent panel 10 adjacent to the side vertical walls 27 which are secured to the top wall 8, and serve as a light lock, affording an enclosure within which the plate-supporting frame 24 is arranged during exposure. The springs 26 act to receive the plate-supporting frame and hold it in slightly elevated position to permit removal of the light shield preliminarily to pressing the plate down against the transparent flexible layer 19 and copy for exposure.

The upstanding walls 27 extend across the back and forwardly along both sides adjacent to the plate-supporting frame when the latter is in exposure position, as shown in Fig. 5, while at its front edge, the supporting frame is engaged by hooks 30 carried by side walls 27 and rests upon a strip 28 of sponge rubber or other suitable material that is compressible beneath the ledge 18, when the plate is forced down, thus affording a complete light seal entirely around the plate-supporting frame, which is held in exposure position by means of a resilient pad 29 of sponge rubber or other suitable compressible material mounted on a pressure plate 31 that is connected by means of links 32 to a lever 33, the latter being pivotally connected at 34 between the upstanding brackets 35 attached at the rear of the top wall 8. The lever 33 and resilient pressure pad 29 are held in elevated position when released by a spring 36 suitably connected at one end to the cabinet and at its upper end to an arm 37 carried by the lever 33, which latter is provided with an operating handle 38 at its forward end, and a pivoted catch 39 engageable with a detent 41 attached to the forward wall 6 of the cabinet and acting to hold the pressure pad in lowered position during exposure of the plate.

Before exposing the electrophotographic plate, its photoconductive surface is electrostatically charged, and to accomplish this, electrostatic charging means is arranged in a charging chamber at the top of the lower portion of the cabinet and preferably immediately under the lamp chamber 11.

Figure 6:
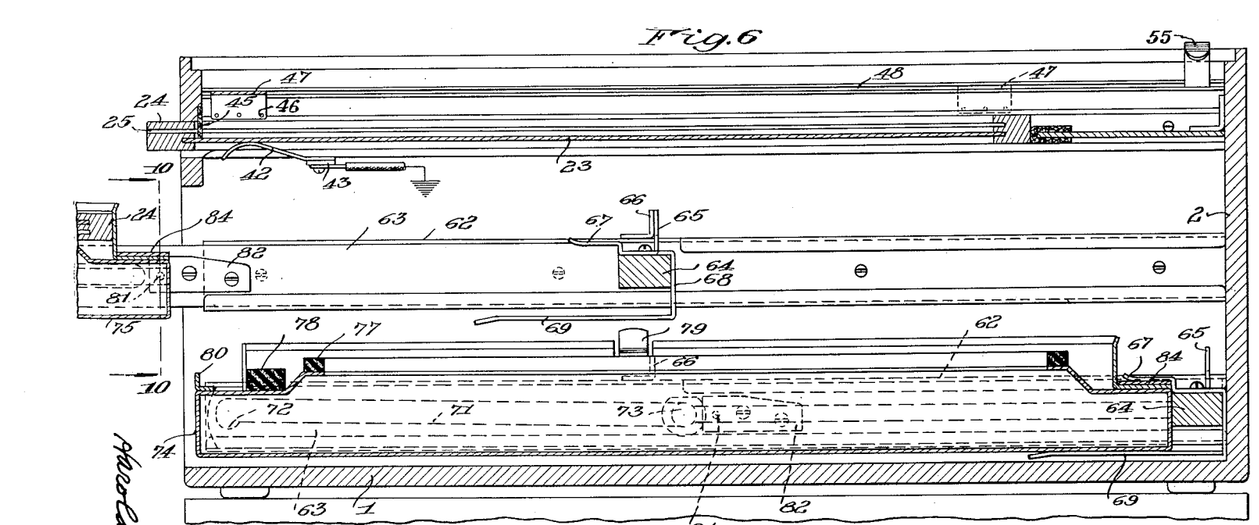
Fig. 6 is a vertical sectional view in the same plane as Fig. 5 with the upper portion of the cabinet broken away, showing the powder receptacle for cleaning powder moved within the cabinet to its inoperative position and the powder receptacle for electroscopic or developer powder moved outwardly from the cabinet with a plate attached thereto for receiving powder, the outer portions thereof being broken away.

In Fig. 6, there is illustrated a plate-supporting frame and electrophotographic plate positioned in the charging chamber with the light shield removed from the supporting frame, the plate when in such position being grounded by a spring contact 42 suitably attached to the cabinet at 43 and grounded, the spring arm 42 being in position to engage the underside or conductive back of the electrophotographic plate when the latter is inserted in charging position. 45 is a felt light guard attached to the cabinet adjacent to the opening through which the plate is inserted in suitable guideways arranged in the cabinet, the felt guard 45 lying against the slot 25 in the plate-supporting frame and covering said slot after the light shield has been removed, so as to prevent access of light to the photoconductive surface of the plate during the charging operation while in the charging chamber.

Electrostatic charging of the photoconductive surface of the plate is effected by the charging wires 46 extending transversely of the charging chamber and mounted on a plate 47, one end of which travels in a slot in guide plate 48 while its opposite end is mounted upon an insulating supporting black 49 that is slidable on a fixed conducting rod 51 extending endwise of the cabinet, while 52 designates a contact arm carried by the block 49 and engaging the rod 51 during such endwise travel to complete an electrical circuit to the charging wires 46 which are electrically connected through conductor 53 to the contact arm 52. 54 and 55 designate spring contact arms connected respectively to the rod 51 and to guide plate 48 to complete the electrical circuit to the charging means and to ground respectively, the spring arms 54 and 55 being arranged to engage contacts 56, see Fig. 5, when the upper portion of the cabinet is positioned on the lower portion to complete the circuit, as will be described more fully presently.

The charging wires 46 and plate 47 on which they are mounted normally occupy a position at the forward end of the cabinet, as shown in Fig. 5, and are movable to the rear of the cabinet and back to initial position for charging a plate by means of a handle or knob 57 that is carried by a pin that extends through a slot in the side wall 3 of the cabinet and is connected to the insulating block 49, the slot through which the pin extends being protected by suitable felt elements in contact with each other to prevent entrance of light into the charging chamber as the knob is moved endwise of the slot in the cabinet to effect the necessary charging of the plate.

Figure 19:
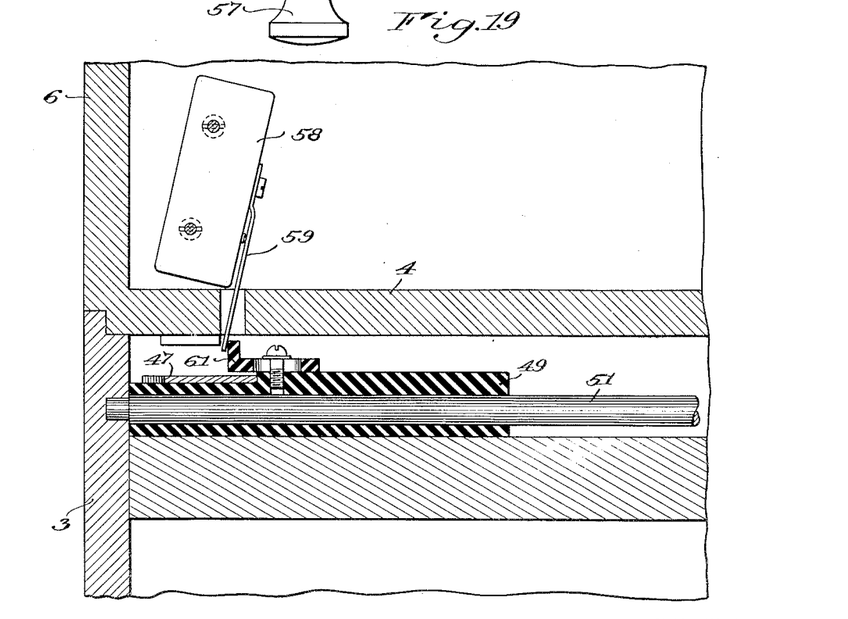
Fig. 19 is an enlarged detail sectional view taken on line 19—19 of Fig. 18.
Figure 20:
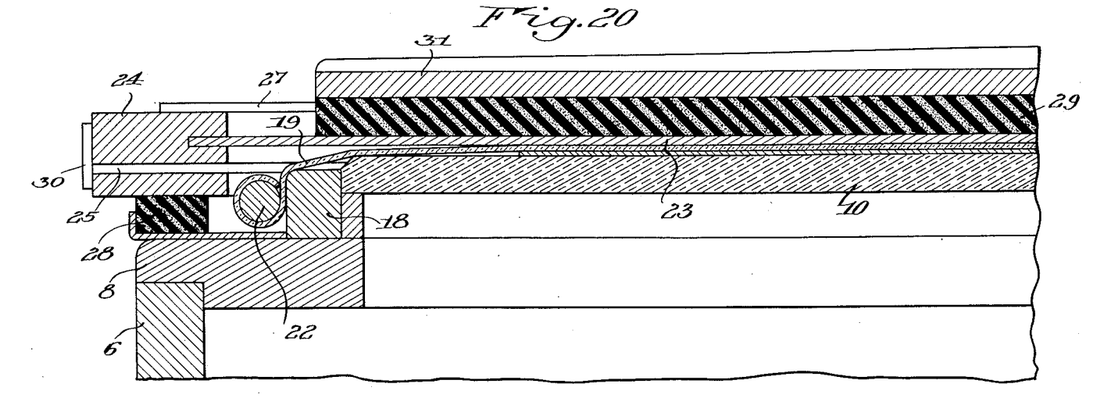
Fig. 20 is an enlarged detail sectional view in the same plane as Fig. 5.

When a plate-supporting frame is inserted into the charging chamber in the position shown in Fig. 5 and the light shield removed, by moving the knob 57 rearwardly of the cabinet as far as permitted, and thence to its forwardmost position, the photoconductive surface of the plate is given an electrostatic charge and is ready for exposure, as described above. It is desirable to maintain the electrical charging circuit open when the charging wires are at the front of the cabinet and to close the circuit automatically as the charging wires are moved rearwardly, and this is accomplished by the microswitch 58, see Fig. 19, which includes a switch arm 59 located in the path of a projection 61 carried by the movable insulating block 49, the arrangement being such that when the insulating block and charging wires are moved to their extreme forward position, the projection 61 engages the arm 59 and opens the switch 58, thus breaking the circuit to the charging wires, the circuit being automatically closed as soon as the charging wires and block 49 are moved rearwardly to charge a plate.

After a plate has been electrically charged and exposed, as hereinbefore described to form on the photoconductive layer an electrostatic image of the subject, it next has applied to it a developer or electrostatic powder by gravitating or cascading the powder over the plate and this is accomplished by mechanism arranged in a chamber preferably located immediately beneath the electrostatic charging chamber and provided with mechanism normally located within the powder receptacle chamber and adapted to be withdrawn therefrom to permit positioning the plate thereon and applying the powder in the manner that will now be described.

This is preferably accomplished by means of a rocking powder receptacle that is mounted on a support slidable within the chamber so that when the support is moved to its rearward limit within the chamber, the powder receptacle is housed within the cabinet. The receptacle contains any suitable developer powder, and when it is desirable to apply powder to a plate, the powder receptacle and support can be withdrawn from the cabinet to a position that permits placing the plate on the powder receptacle to which it is temporarily attached, and rocking the receptacle on its support through an angle of nearly 360°, permitting a complete revolution of the powder receptacle and consequent flowing of the powder from the open top of the powder receptacle over the photoconductive surface of the plate which carries the electrostatic image, such oscillation of the powder receptacle being repeated if necessary until the powder uniformly and effectively adheres to the electrostatic image, whereupon the powder receptacle can be restored to its normal horizontal position, the plate removed, and the powder receptacle together with its support pushed inwardly into the cabinet.

To accomplish this, the cabinet is provided on opposite sides with metal guideways 62 which are suitably fastened to the side walls of the cabinet, and slidable within said guideways is a support or frame comprising the side rails 63 connected by a transverse member 64, see Fig. 6, that carries upstanding lugs 65 engageable with fixed lugs 66 attached to the guideways 62, and 67 designates an upper spring tongue formed on a plate 68 which also includes a bottom tongue 69 to receive and frictionally retain the rear end of the powder receptacle when the latter is moved inwardly, as shown in Fig. 6, in the lowermost powder compartment.

Figures 7, 8:
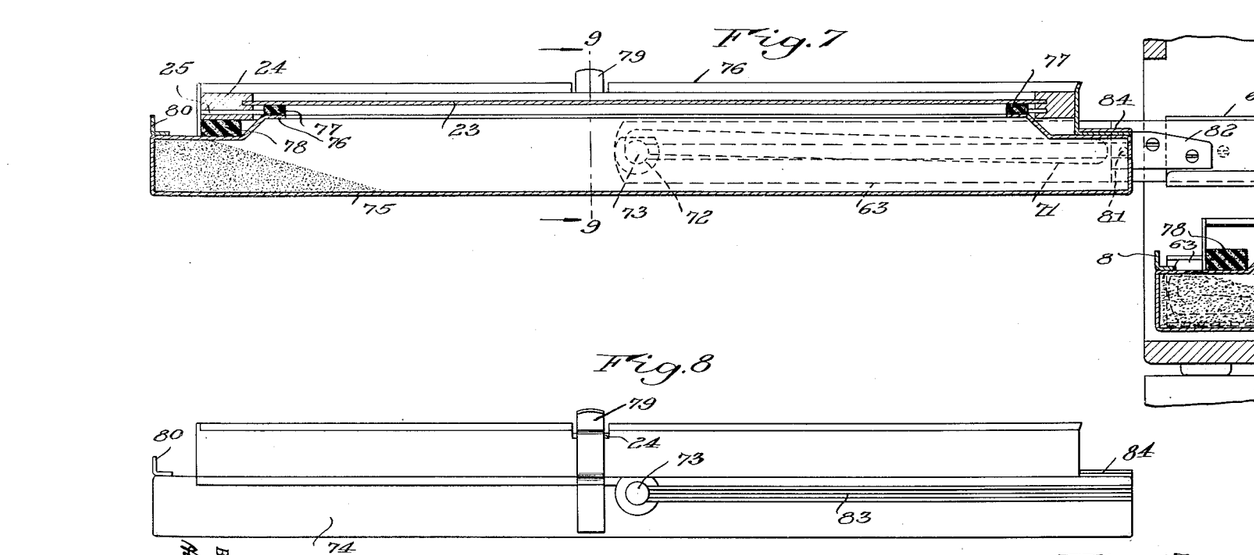
Fig. 7 is a vertical sectional view in the same plane as Fig. 6 showing the powder receptacle for developer powder in its outermost position with the electrophotographic plate secured thereon as in Fig. 6, the inner portions of the powder receptacle and its slidable support being broken away.
Fig. 8 is a detail view in side elevation of the powder receptacle illustrated in Fig. 7.
Figure 9:
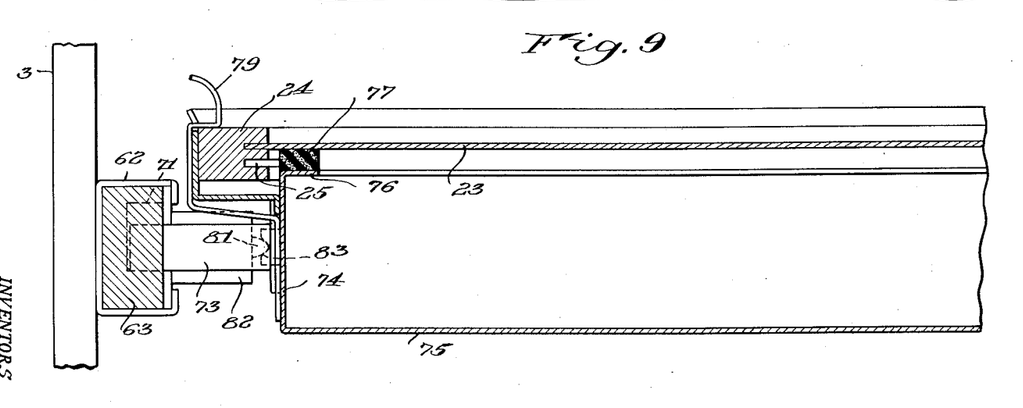
Fig. 9 is an enlarged detail vertical sectional view on line 9—9 of Fig. 7.
Figure 10:
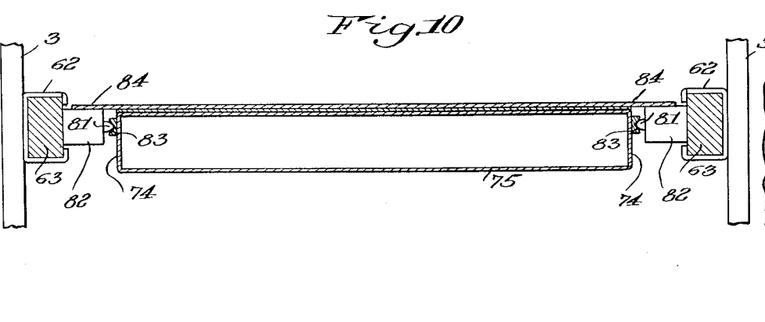
Fig. 10 is an enlarged detail sectional view on line 10—10 of Fig. 6.
Figure 10A:
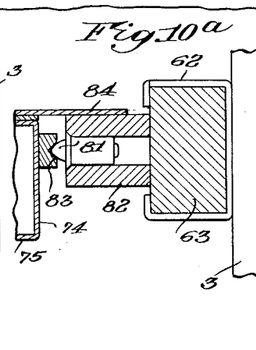
Figure 11:
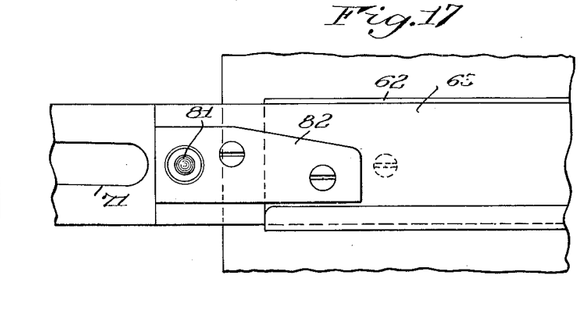
Fig. 11 is a top plan view of the lower portion of the cabinet with the upper portion removed, showing the charging mechanism, and the powder receptacle immediately therebeneath moved outwardly to the front of the cabinet to a position for rotation and applying dust to a plate when the plate is attached.
Figure 12:
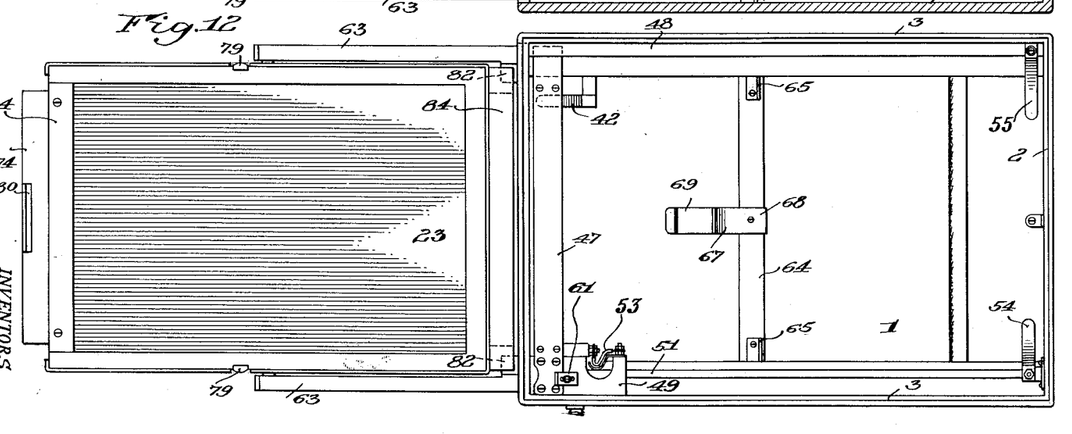
Fig. 12 is a view similar to Fig. 11 showing a plate attached to the powder receptacle preparatory to receiving powder when the plate and powder receptacle are rotated.

The side rails 63 are slotted endwise as at 71, said slots having depressions 72 at their forward ends for a purpose that will appear presently, and the slots being adapted to receive trunnions 73 fixed to the sides 74 of a powder receptacle of metal or other material that includes a bottom 75 and a top wall having an opening therein defined by a lateral flange 76, see Figs. 7 and 9, upon which is secured a compressible or sponge rubber strip element 77, extending entirely around the powder opening and engaging the adjacent surface of the electrophotographic plate, as shown, to prevent loss of powder between the plate and receptacle during the process of applying powder to the photoconductive surface, it being understood that the light shield is removed from the plate-supporting frame during the process of applying powder to the plate.

At the forward end of the powder receptacle, there is provided a compressible or sponge rubber strip 78 extending across the receptacle and suitably secured thereto, affording a light lock for the front end of the supporting frame while the light shield is being removed. Before the supporting frame is secured in position on the powder receptacle, the rubber strip 78 extends slightly above the rubber strips 77 which surround the powder opening, and thus holds the front end of the supporting frame in sufficiently high position to permit removal of the light shield, and after the latter is removed from the supporting frame, the frame is pressed down manually, compressing the strip 78 at the front and the strips 77 around the opening until the sides of the frame are engaged by the spring catches 79 which hold the plate tightly engaged with the rubber strips 77 and in position over the opening in the powder receptacle so that when the latter is oscillated, the powder is distributed effectively and evenly over the entire surface of the electrostatic image. 80 is a flange secured to the powder receptacle for engaging and pulling the same outwardly.

Figures 13, 14:
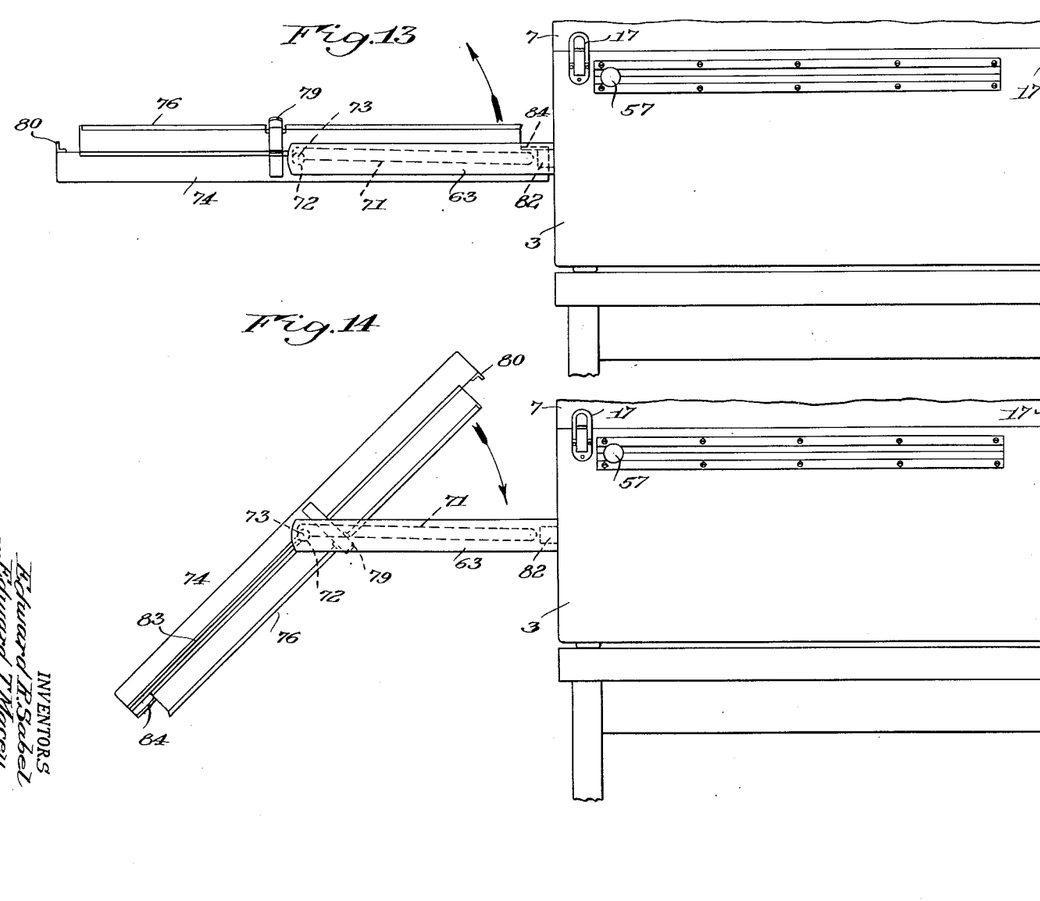
Fig. 13 is a diagrammatic view in side elevation showing the position of a powder receptacle when a plate is initially positioned, before releasing and rocking the powder receptacle on its support.
Fig. 14 is a similar view showing the powder receptacle and plate rotated on the support in an anti-clockwise direction through an angle of nearly 360° for applying powder to the plate.
Figure 15:
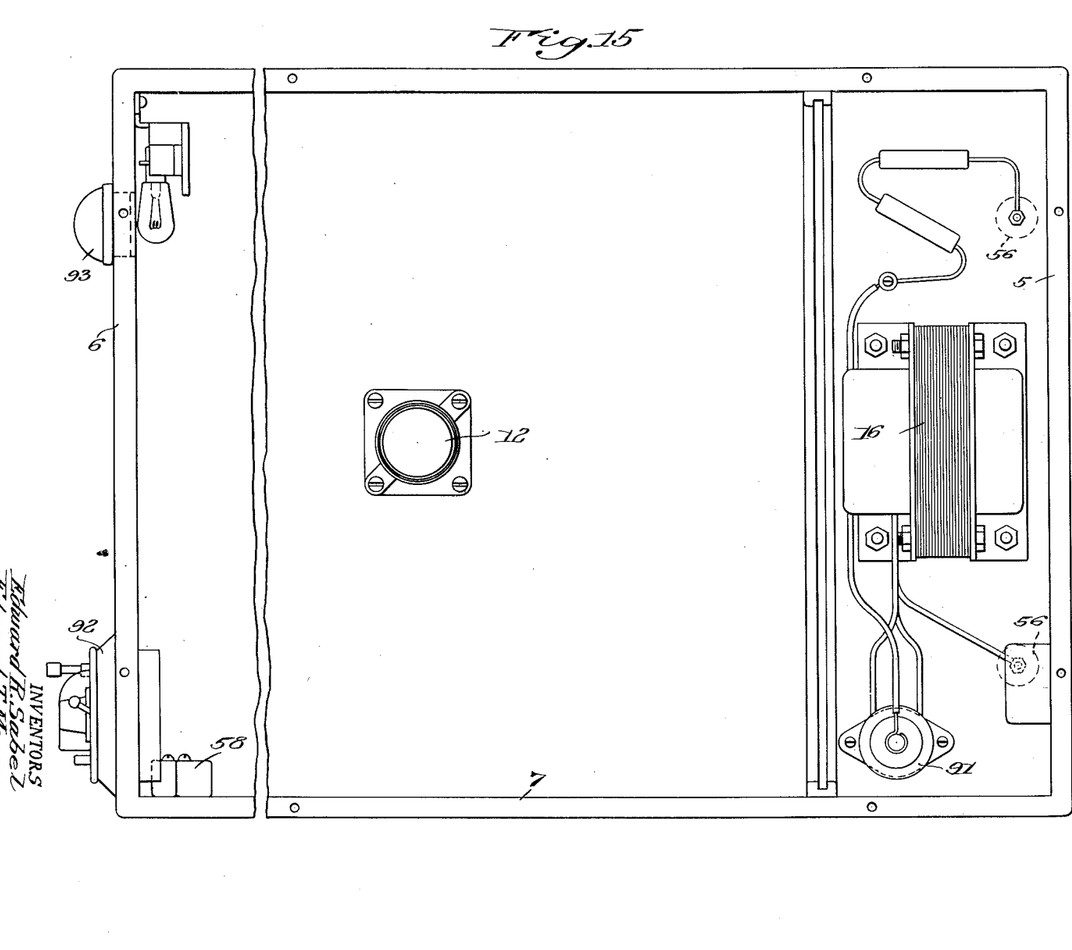
Fig. 15 is a plan view of the upper part of the cabinet showing the lamp chamber and electrical mechanism.
Figure 16:
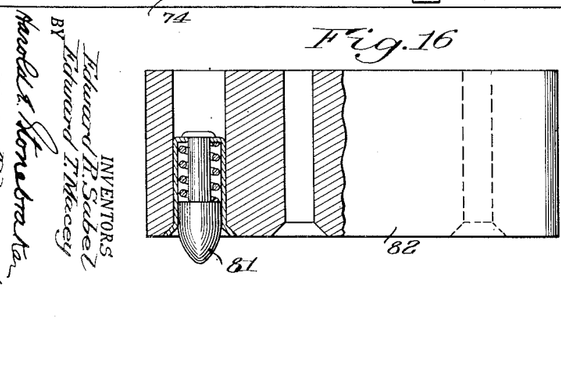
Fig. 16 is an enlarged detail sectional view of a block carrying one of the spring-actuated locking pins for releasably holding the powder receptacle on the support.
Figure 18:
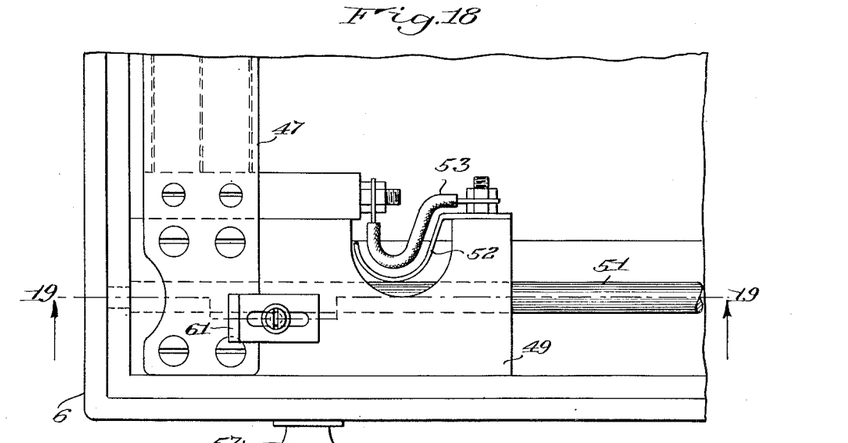
Fig. 18 is an enlarged partial plan view of a portion of the cabinet showing part of the charging mechanism.

The powder receptacle is normally held against oscillation relatively to the side rails 63 by means of the spring-actuated pins 81, see Figs. 16 and 17, which are mounted in blocks 82 fastened to the side rails 63 of the slidable support, the spring-actuated locking pins 81 being releasably engaged with grooves 83 provided in plates on the sides of the powder receptacle, while 84 designates a plate at the rear of the powder receptacle that engages the top surfaces of the blocks 82 and prevents clockwise movement of the receptacle on its support. When the plate-supporting frame is attached to the powder receptacle in the position shown in Fig. 7, by manually pressing the inner end of the powder receptacle upwardly against the tension of the spring pins 81, the receptacle is released from the spring pins and can then be rotated in an anti-clockwise direction, as indicated in Figs. 13 and 14, through nearly 360° or until the upper surface of the receptacle has made almost a complete turn and is engaged with the underside of the blocks 82, as illustrated in Fig. 14, which thus limit their movement, and the powder receptacle is then reversely turned to restore it to its initial position where it can be engaged by the spring pins 81 and retained in position on the slidable frame.

After the powder receptacle has been returned to its initial position as just described, the plate-supporting frame is removed by releasing the spring catches 79 at opposite sides of the powder receptacle, and the latter can then be moved to a position within the cabinet for which purpose the front end of the receptacle must be elevated slightly to remove the trunnions 73 from the depressions 72 at the forward ends of the slots 71, which position they occupy during oscillation. The receptacle can then be pushed rearwardly until the trunnions 73 engage the rear ends of the slots 71, whereupon further rearward movement carries the side rails 63 and the support on which the powder receptacle is mounted rearwardly until the parts assume the position illustrated at the bottom of Fig. 6 where the powder receptacle is arranged within the cabinet at the limit of its rearward movement.

After a powder image has thus been formed on the plate by applying electroscopic powder, the powder image is transferred to a suitable transfer sheet and this may be accomplished by positioning a sheet of paper over the powder image in contact with the plate and sliding the plate and paper transfer sheet into the electrostatic charging compartment after which the electrostatic charging wires are moved to the rear of the compartment and thence forwardly to initial position over the transfer sheet in the same manner as already described for charging the plate, such movement of the electrostatic charging wires imposing a charge on the paper and thus causing the powder image to be transferred from the plate to the paper, after which the powder image is affixed to the transfer sheet in any suitable fashion, as by placing the sheet for a short interval of time between hot plates or in any other desirable way which forms no part of the present invention. After the powder image is thus transferred to a paper sheet, it is necessary to remove any powder particles that may remain on the electrophotographic plate before it is again charged for another exposure, and such cleaning of the plate can be effected by means of a cleaning powder contained in a powder receptacle preferably located at the bottom of the cabinet and under the developer powder receptacle already described.

The cleaning powder may be of any suitable granular or other cleaning material suitable for the purpose and arranged within a receptacle 85 at the bottom of the cabinet. The receptacle which contains the cleaning powder is supported and operated the same as the receptacle previously described in which the developer powder is arranged, and the parts being the same as for the developer powder receptacle, no further description of the cleaning powder receptacle is required. Since it is unnecessary to provide a light lock when cleaning a plate, it is unnecessary to have the light shield in the supporting frame when positioning the plate on the cleaning powder receptacle, and consequently the compressible rubber strip which is arranged across the front end of the developer powder receptacle, as indicated at 78, for the purpose of permitting removal of the light shield, is omitted on the cleaning powder receptacle. In other respects, the construction and operation is the same, the plate-supporting frame and plate being fastened to the cleaning powder receptacle and rocked through nearly 360° one or more times to insure complete and thorough application of the cleaning powder over the entire surface of the plate so that any particles of developer powder are completely removed before the plate is again charged and exposed. After thus cleaning the plate and removing it from the cleaning powder receptacle, the latter can be pushed rearwardly into the cabinet until required for a subsequent cleaning operation.

Figure 1:
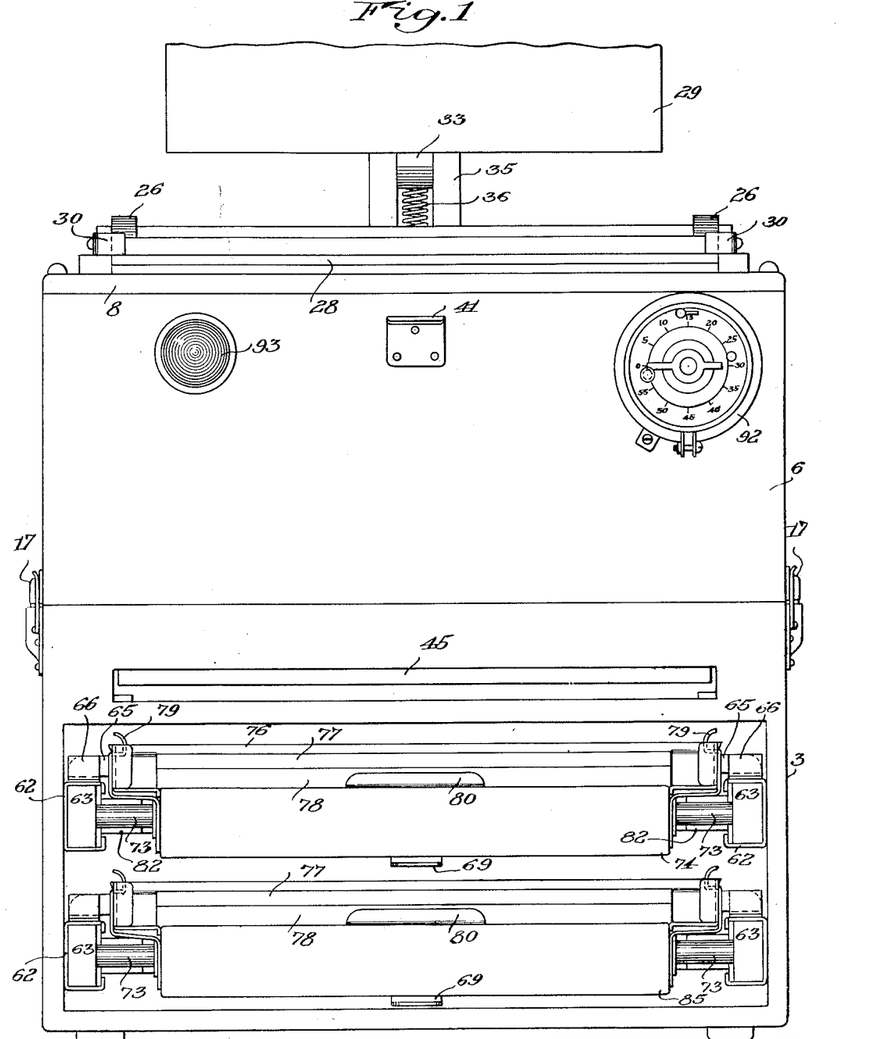
Fig. 1 is a view in front elevation of an electrophotographic apparatus made in accordance with a preferred embodiment of the invention, showing the pressure pad in elevated or inoperative position.
Figure 2:
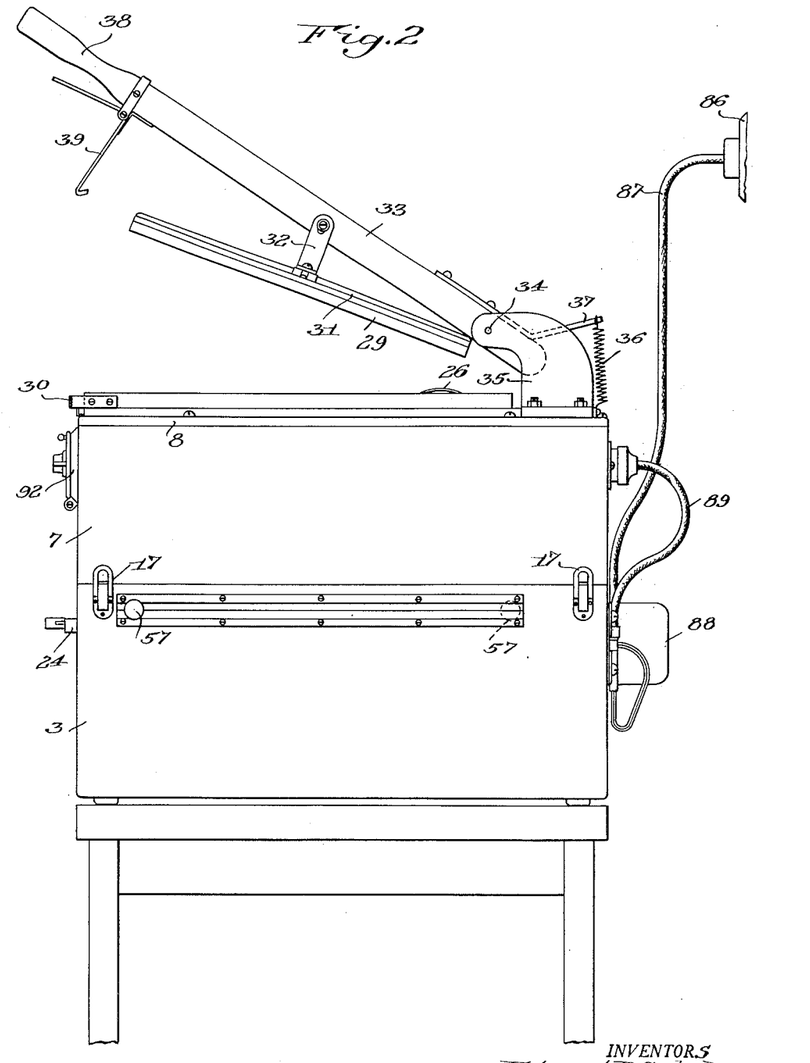
Fig. 2 is a view in side elevation of the same.
Figure 3:
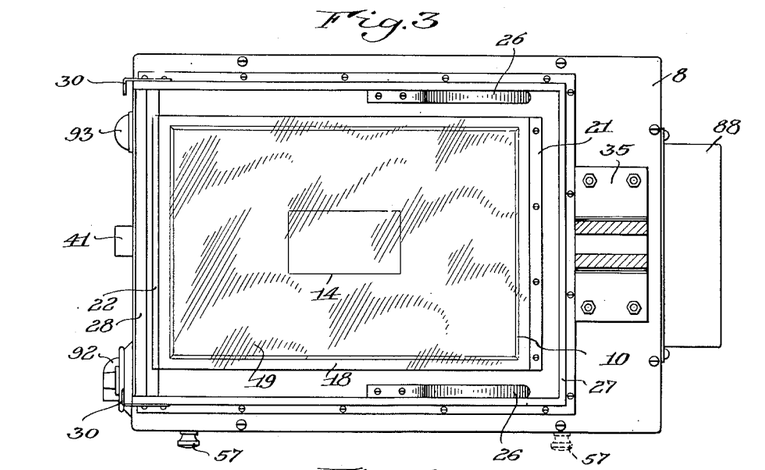
Fig. 3 is a top plan view of the apparatus, partially in section, with the pressure pad removed.
Figure 4:
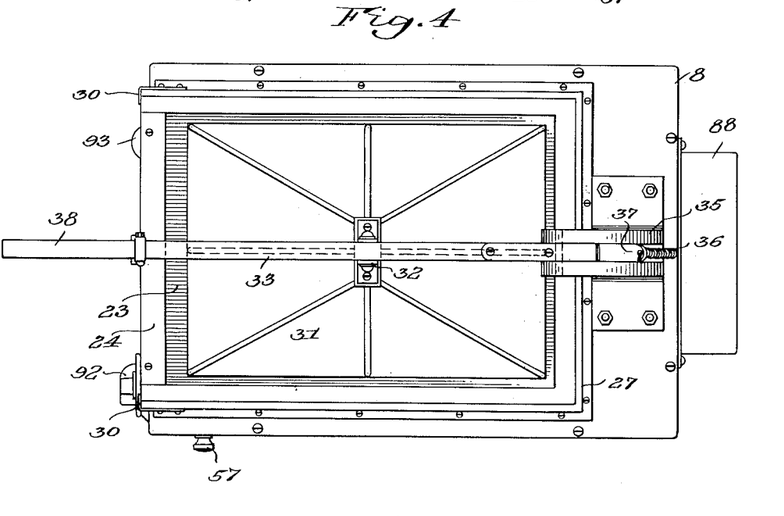
Fig. 4 is a top plan view showing the pressure pad in lowered position when holding an electrophotographic plate engaged with the copy.

Electrical current is supplied to the apparatus from any suitable source, as for instance from a plug 86 connected to a socket, see Fig. 2, while 87 designates a conductor leading to a conventional stabilizer 88 from which a conductor 89 leads to transformer 16, connected with a rectifier 91, from which conductors lead to the contacts 56 which connect with the spring contacts 54 when the upper portion of the cabinet is positioned upon the lower portion thereof, see Fig. 5. One of the contacts 56 is grounded while the other is connected through its contact 54 to the conducting rod 51 and charging wires. 92 designates a timer and switch connected in the control circuit by conductors not shown, the timer, rectifier and transformer all being arranged and operating substantially as shown in copending application Serial No. 63,922, filed December 7, 1948, now Patent No. 2,588,675, and forming no part of the present invention.

When charging the electrophotographic plate or transferring a powder image from the plate to a transfer sheet, a rectified A. C. current of 6,000 volts and about ½ milliamperes may be used, and 93 is a tell-tale lamp which may be arranged in the circuit with the lamp 12 in the lamp chamber to indicate to the operator when the lamp in the lamp chamber is operating.

The operation of the apparatus briefly is as follows: Assuming the parts to be in the position shown in Fig. 2 and the electrical circuits to the charging mechanism and lamp being open, the first operation is to clean the electrophotographic plate, and this is accomplished by pulling out from the cabinet chamber the lowermost powder receptacle which remains in horizontal position on its support as it is withdrawn from the cabinet. When in its outermost position, the electrophotographic plate in its supporting frame with its shield removed is arranged over the opening of the powder receptacle and forced downwardly thereon until engaged by the spring catches 79 which hold the plate tightly engaged with the rubber strips 77 surrounding the opening in the receptacle, as indicated in Fig. 5. The inner end of the powder receptacle is then engaged and pressed upwardly in an anti-clockwise direction to release the spring pins 81 from the grooves 83, and the receptacle can then be turned in an anti-clockwise direction until it is moved through nearly one complete turn, as indicated in Fig. 14. Its movement is then stopped and can be reversed to turn the receptacle in the opposite direction or back to initial position. One or more complete turns of the receptacle can be effected as required to insure adequate cleaning of the plate, whereupon the inner end of the receptacle is pushed downwardly to reengage it with the spring locking pins 81. The plate and its supporting frame are then removed from the receptacle by manually releasing the spring catches 79 and the powder receptacle pushed back into the cabinet.

The plate is then ready to be charged, and for this purpose the plate and its supporting frame are inserted into the charging chamber as illustrated in Fig. 5, and the charging wires moved rearwardly and then returned to initial position through a complete cycle to effect charging of the photoconductive layer on the top surface of the plate. During this operation, the circuit to the charging wires is automatically closed and again opened by the switch arm 59 and microswitch 58 as already described, and the plate grounded through the contact 42 engaging its undersurface. When the plate is completely charged, the light shield is inserted through slot 25 to cover and protect the charged surface of the plate from light, the plate being then ready for exposure, and it will be understood that during the charging operation, the charging compartment is completely sealed against light. Following charging of the plate, the subject to be copied is laid on the transparent panel 10 of the lamp chamber facing upwardly, and the flexible transparent layer 19 is drawn smoothly over the copy and held in taut position by the rod or weighted element 22 at its forward edge. The electrophotographic plate is then positioned over the flexible transparent layer 19 with the photoconductive surface facing downwardly and the frame resting on the springs 26 temporarily until the light shield is removed from the supporting frame, following which the compressible pressure pad 29 is moved downwardly by operating handle 38, to engage the plate and force it tightly and uniformly against the transparent layer to hold the copy against the transparent panel, the pressure pad being held in such lowered position by the catch 39 engaging lug 41. The switch controlling timer 92 is then operated to close the circuit to the lamp 12 for a predetermined period, depending upon the setting of the timer switch, and resulting in exposure of the photoconductive surface to light which passes through the transparent panel, copy, and transparent flexible layer to produce an electrostatic image on the plate, due to draining away the electrostatic charge on the plate through its conductive backing where light strikes the plate and retaining the charge on the plate where the light is obstructed by the image, all in accord with the known practice of electrophotography.

After the electrostatic image is thus formed on the plate, the circuit to the lamp and the lamp chamber is automatically opened by the timer switch and the operator then releases the pressure pad by swinging the catch 39 away from lug 41, permitting spring 36 to move the pressure pad 29 and its supporting rod 33 upwardly to the position shown in Fig. 2. The springs 26 and resilient strip 28 at the front of the cabinet then move the supporting frame slightly in an upward direction, sufficiently to permit insertion of the light shield into the plate-supporting frame to protect the image on the plate after it is removed from exposure position. It is then necessary to apply electroscopic or developer powder to the electrostatic image in order to form a powder image, and in order to accomplish this the upper powder receptacle containing developing powder is pulled outwardly from the cabinet to the position shown in Fig. 7, and the plate with its supporting frame and the light shield in position are arranged over the opening in the powder receptacle in a position slightly above that illustrated in Fig. 7, the front end of the supporting frame resting upon the compressible rubber strip 78 which in the initial position is slightly above the rubber strip 77 at the forward edge of the opening in the receptacle. This enables removing the light shield from the supporting frame following which the supporting frame and plate are forced downwardly until the supporting frame is engaged by the spring catches 79, and during such downward movement of the supporting frame, the resilient rubber strip 78 is compressed to the position illustrated in Fig. 7 and the plate engages the rubber strips 77 and compress the latter slightly, said strips forming an effective light shield and powder guard extending entirely around the edge of the plate. The powder receptacle is then engaged at its inner end and moved upwardly in an anti-clockwise direction to release the spring pins 81, following which the powder receptacle is rotated slowly through nearly one complete turn until it reaches approximately the position shown in Fig. 14, and during such rotation, when the powder receptacle is reversed vertically and its opening is on the bottom and above the electrophotographic plate, the powder from the receptacle is caused to gravitate slowly across the plate and thus form a powder image due to the developer powder adhering to the electrostatic image previously produced on the plate during exposure. After one or more complete turns, sufficient to insure forming a proper powder image, the powder receptacle is restored to initial position, its rear end being pushed downwardly to reengage the spring locking pins 81 which hold it normally in the horizontal relation on its support, as illustrated in Figs. 6 and 7. The plate-supporting frame is then released by manually engaging the spring catches 79 and removed from the powder receptacle which can be pushed rearwardly into the cabinet out of operative position. If desirable at any time to remove either one of the powder receptacles from its support, this can easily be accomplished when the powder receptacle is in its outermost horizontal position, as illustrated in Fig. 7, by lifting its rear end upwardly to release the spring locking pins, and then moving the receptacle about a vertical central axis, or swinging it bodily to disengage the trunnions 73 from the slots 71 in the slidable rails 63, and the powder receptacle can then be lifted vertically away from the rails 63.

After the powder image is thus formed on the electrophotographic plate, it is transferred to a paper or other transfer sheet and this is accomplished by laying a suitable sheet of paper over the powder image on the plate and with the paper in such position, inserting the plate-supporting frame with the paper thereon into the electrostatic charging compartment and operating the charging wires in the manner already described to impose an electrostatic charge over every portion of the transfer sheet, which results in the powder image being transferred from the plate to the paper sheet superposed thereon. The plate and transfer sheet are then removed from the charging chamber and the powder image affixed to the transfer sheet by positioning between hot plates or by any other suitable mechanism or process which forms no part of the present invention.

While the invention has been described in relation to the particular structure herein disclosed, it is not confined to the details described, and this application is intended to cover such modified arrangements or departures as may come within the intended purposes of the invention and the scope of the following claims.

We claim:

1. A unitary apparatus for powder-cleaning, charging, exposing, and powder-developing an electrostatic image on an electrophotographic plate to produce a powder image, said apparatus consisting of a cabinet having a lamp chamber for exposing an electrophotographic plate to a light image along one extremity, a charging chamber in the cabinet and optically separated from the lamp chamber, electrostatic charging means in the charging chamber to impose an electric charge on the surface of an electrophotographic plate when in the charging chamber, powder receptacle chambers, a slidable support in each of said powder receptacle chambers, a plate-holding powder receptacle mounted on each of said supports and movable therewith from a position within the cabinet to a position in front of the cabinet, the powder receptacle being rotatable in a rocking motion on the support when positioned in front of the cabinet to cascade a powder across the surface of an electrophotographic plate when on the receptacle, said support comprising rails slidable in the cabinet and having slots therein, trunnions mounted on the sides of the powder receptacle mounted in said slots permitting endwise bodily movement and rotational movement of the receptacle on said rails, releasable means for holding the receptacle against rotation on the rails, and stop means limiting such rotational movement.

2. A unitary apparatus for powder-cleaning, charging, exposing, and powder-developing an electrostatic image on an electrophotographic plate to produce a powder image, said apparatus consisting of a cabinet having a lamp chamber for exposing an electrophotographic plate to a light image along one extremity, a charging chamber in the cabinet and optically separated from the lamp chamber, electrostatic charging means in the charging chamber to impose an electric charge on the surface of an electrophotographic plate when in the charging chamber, powder receptacle chambers, a slidable support in each of said powder receptacle chambers, a powder receptacle mounted on said support and movable from a position within the cabinet to a position in front of the cabinet, the powder receptacle being rotatable in a rocking motion on the support when positioned in front of the cabinet to cascade a powder across the surface of an electrophotographic plate when on the receptacle, a transparent panel in the top wall of the lamp chamber, means acting to hold a copy sheet against said transparent panel comprising a flexible transparent sheet attached at one edge to the cabinet at a point below said transparent panel, said flexible sheet being positionable over said transparent panel and having attached at its opposite edge a weighted rod which extends below said transparent panel and acts to hold the transparent sheet in taut position over the copy sheet and transparent panel, a vertical wall extending above said transparent panel on three sides, a resilient strip extending across the remaining side of the cabinet in front of said transparent panel between the side vertical walls, and a resilient pressure pad engageable with an electrophotographic plate and acting to hold the latter against said transparent sheet and resilient strip adjacent to said vertical walls.

3. A unitary apparatus for powder-cleaning, charging, exposing, and powder-developing an electrostatic image on an electrophotographic plate to produce a powder image, said apparatus consisting of a cabinet having a lamp chamber for exposing an electrophotographic plate to a light image and a charging chamber beneath the lamp chamber, electrostatic charging means in the charging chamber to impose an electric charge on the surface of an electrophotographic plate when in the charging chamber, a receptacle chamber beneath the charging chamber, a slidable support in the receptacle chamber, a powder receptacle rotatably mounted on said support and having an opening in its top, and means for holding an electrophotographic plate against said opening to cascade a powder across the surface of an electrophotographic plate when on the receptacle.

4. A unitary apparatus for charging, exposing and powder developing an electrostatic image on an electrophotographic plate and transferring said powder image to a transfer member to produce an image copy, said apparatus consisting of a cabinet having a lamp chamber along one extremity for exposure of the plate to a light image of copy to be reproduced, a charging chamber in the cabinet separated from the lamp chamber by a light barrier, a corona discharge electrode in the charging chamber adapted to impose a charge on the surface of an electrophotographic plate inserted therein, at least one powder receptacle chamber in the cabinet, a support in each of said powder receptacle chamber positionable within the cabinet and movable to extend from the cabinet, and a plate-holding powder receptacle mounted on each of said supports and movable therewith from a position within the chamber and the cabinet to a position in front of the cabinet, the powder receptacle having an open top adapted to receive an electrophotographic plate thereon and means to secure an electrophotographic plate facing downwardly on said receptacle, the receptacle with the plate secured thereon being rotatable to a position with the open part of the receptacle facing downward and then rotatable in a rocking motion on its support when extended in front of the cabinet to cascade a powder across the surface of the plate, whereby an electrophotographic plate may be exposed to a light image and processed in the unitary apparatus to yield an electrophotographic copy of the image.

5. A unitary apparatus for charging, exposing and powder developing an electrostatic image on an electrophotographic plate and transferring said powder image to a transfer member to produce an image copy, said apparatus consisting of a cabinet having a lamp chamber along one extremity for exposure of the plate to a light image of copy to be reproduced, a charging chamber in the cabinet and separated from the lamp chamber by a light barrier, a corona discharge electrode in the charging chamber adapted to impose a charge on the surface of an electrophotographic plate inserted therein, at least one powder receptacle chamber in the cabinet, a slidable support in each of said powder receptacle chambers positionable within the cabinet and movable to extend from the cabinet, a plate-holding powder receptacle mounted on each of said supports and movable therewith from a position within the chamber and cabinet to a position in front of the cabinet, the powder receptacle having an open top adapted to receive an electrophotographic plate thereon and means to secure an electrophotographic plate facing downwardly on said receptacle, the receptacle with the plate secured thereon being rotatable to a position with the open part of the receptacle facing downward and then rotatable in a rocking motion on the support when positioned in front of the cabinet, releasable means for holding the powder receptacle against rotation on the support, and stop means for limiting rotational movement of the powder receptacle on the support, the receptacle being adapted to cascade a powder across the surface of the plate, whereby an electrophotographic plate may be exposed to a light image and processed in the unitary apparatus to yield an electrophotographic copy of the image.

6. Unitary electrophotographic apparatus for reproducing copy comprising a cabinet having a lamp chamber at one extremity thereof, a light transmitting panel in an outside wall of said chamber and a cover movably positioned over said panel to receive and removably secure an electrophotographic plate against the panel for exposing the plate to a light image of copy to be reproduced, a charging chamber optically separated from the lamp chamber by a light barrier, support means in the charging chamber to support an electrophotographic plate therein with at least its electrophotographically-sensitive surface shielded from light and a corona discharge electrode movable over an area across the surface of an electrophotographic plate when on said support means adapted to impose a charge on a plate and adapted to transfer an electrostatic image from a plate to a transfer member when an image bearing plate and a transfer member thereon are on said support means, and at least one powder receptacle having an open top adapted to receive an electrophotographic plate therein and means to secure an electrophotographic plate facing downwardly on said receptacle, the receptacle with the plate secured thereon mounted on movable support means to be withdrawably placed within the cabinet and movable to a supported position outside the cabinet, the receptacle being pivotally mounted on its support means to permit inverting rocking motion around its axis of support thus being adapted to dust a plate held thereon, whereby an electrophotographic plate may be exposed to a light image and processed in the unitary apparatus to yield an electrophotographic copy of the image.

7. A unitary apparatus for charging, exposing and powder developing an electrostatic image on an electrophotographic plate to produce a powder image, said apparatus comprising a cabinet having a lamp chamber along one extremity, a transparent panel in an outside wall of said lamp chamber, a cover movably positioned against the transparent panel and having a resilient pressure pad mounted on its inner surface adapted to press toward the transparent panel when the cover is closed to support an electrophotographic plate for exposure with a superposed copy to be reproduced, a charging chamber in the cabinet and optically separated from the lamp chamber by a light barrier, a corona discharge electrode in the charging chamber to impose an electric charge on the surface of an electrophotographic plate when in the charging chamber, at least one powder receptacle chamber in the cabinet, a slidable support in each of said powder receptacle chambers positionable within the cabinet and movable to extend from the cabinet, and a plate-holding powder receptacle mounted on each of said supports and movable therewith from a position within the chamber and the cabinet to a position in front of the cabinet, the powder receptacle having an open top adapted to receive an electrophotographic plate thereon and means to secure an electrophotographic plate facing downwardly on said receptacle, the receptacle with the plate secured thereon being rotatable to a position with the open part of the receptacle facing downward and then rotatable in a rocking motion on its support when positioned in front of the cabinet to cascade a powder across the surface of a plate held thereon, whereby an electrophotographic plate may be exposed to a light image and processed in the unitary apparatus to yield an electrophotographic copy of the image.

8. A unitary apparatus for charging, exposing and powder developing an electrostatic image on an electrophotographic plate to produce a powder image, said apparatus comprising a cabinet having a lamp chamber along one extremity, a transparent panel in an outside wall of said lamp chamber, a cover movably positioned against the transparent panel and having a resilient pressure pad mounted on its inner surface adapted to press toward the transparent panel when the cover is closed to support an electrophotographic plate for exposure with a superposed copy to be reproduced, a charging chamber in the cabinet and optically separated from the lamp chamber by a light barrier, support means in the charging chamber to support an electrophotographic plate therein, an electrostatic charging electrode in the charging chamber comprising at least one fine conductive strand movable over an area across a plate when supported in the charging chamber to impose a charge on the plate on the support, at least one powder receptacle chamber in the cabinet, a movable support in each of said powder receptacle chambers positionable within the cabinet and movable to extend therefrom, and a plate-holding powder receptacle mounted on each of said supports and movable therewith from a position within the chamber and the cabinet to a position in front of the cabinet, the powder receptacle being rotatable in a rocking motion on its support when positioned in front of the cabinet to cascade a powder across the surface of a plate supported thereon, whereby an electrophotographic plate may be exposed to a light image and processed in the unitary apparatus to yield an electrophotographic copy of the image.

9. Unitary, self-contained apparatus for processing electrophotographic plates comprising a cabinet having a light-tight charging chamber, a developing chamber and a cleaning chamber for charging, developing and cleaning electrophotographic plates and transferring a powder image therefrom, support means in the charging chamber to receive an electrophotographic plate, a corona charging electrode in the charging chamber comprising at least one fine conductive strand on a movable support and means to move the electrode across and parallel with the surface of a plate when on its support to serve the dual role of charging the plate and of transferring a powder image when an image bearing plate and a superposed transfer member are on the support in the charging chamber, a support in each of the developing chamber and the cleaning chamber movable from a position in the cabinet to a position extending from the cabinet, a plate-holding powder receptacle on each of said supports and movable therewith from a position within the cabinet to a position outside the cabinet, the receptacle having an open top adapted to receive an electrophotographic plate thereon and means to secure an electrophotographic plate facing downwardly on said receptacle, the receptacle with the plate secured thereon being rotatable to a position with the open part of the receptacle facing downward and then rotatable in a rocking motion on the support when positioned outside the cabinet to cascade a powder across an electrophotographic plate held thereon, whereby an electrophotographic plate may be repeatedly processed in a combination of charging and developing the plate, transferring an image from the plate to a transfer member and reconditioning the plate for reuse by powder cleaning.

EDWARD R. SABEL.
EDWARD T. MACEY.

REFERENCES CITED

The following references are of record in the file of this patent:

UNITED STATES PATENTS

| Number | Name | Date |
|---|---|---|
| 651,739 | Woodruff | June 12, 1900 |
| 1,482,172 | Weis | Jan. 29, 1924 |
| 2,100,920 | Rogers | Nov. 30, 1937 |
| 2,297,691 | Carlson | Oct. 6, 1942 |
| 2,336,663 | Wolters | Dec. 14, 1943 |
| 2,390,497 | Cambell | Dec. 11, 1945 |
| 2,411,704 | Beattie et al. | Nov. 26, 1946 |
| 2,484,048 | Powers et al. | Oct. 11, 1949 |